July 2, 1940.  H. KLEMPERER  2,206,701
RECTIFIER CIRCUITS
Filed Aug. 1, 1938  2 Sheets-Sheet 1
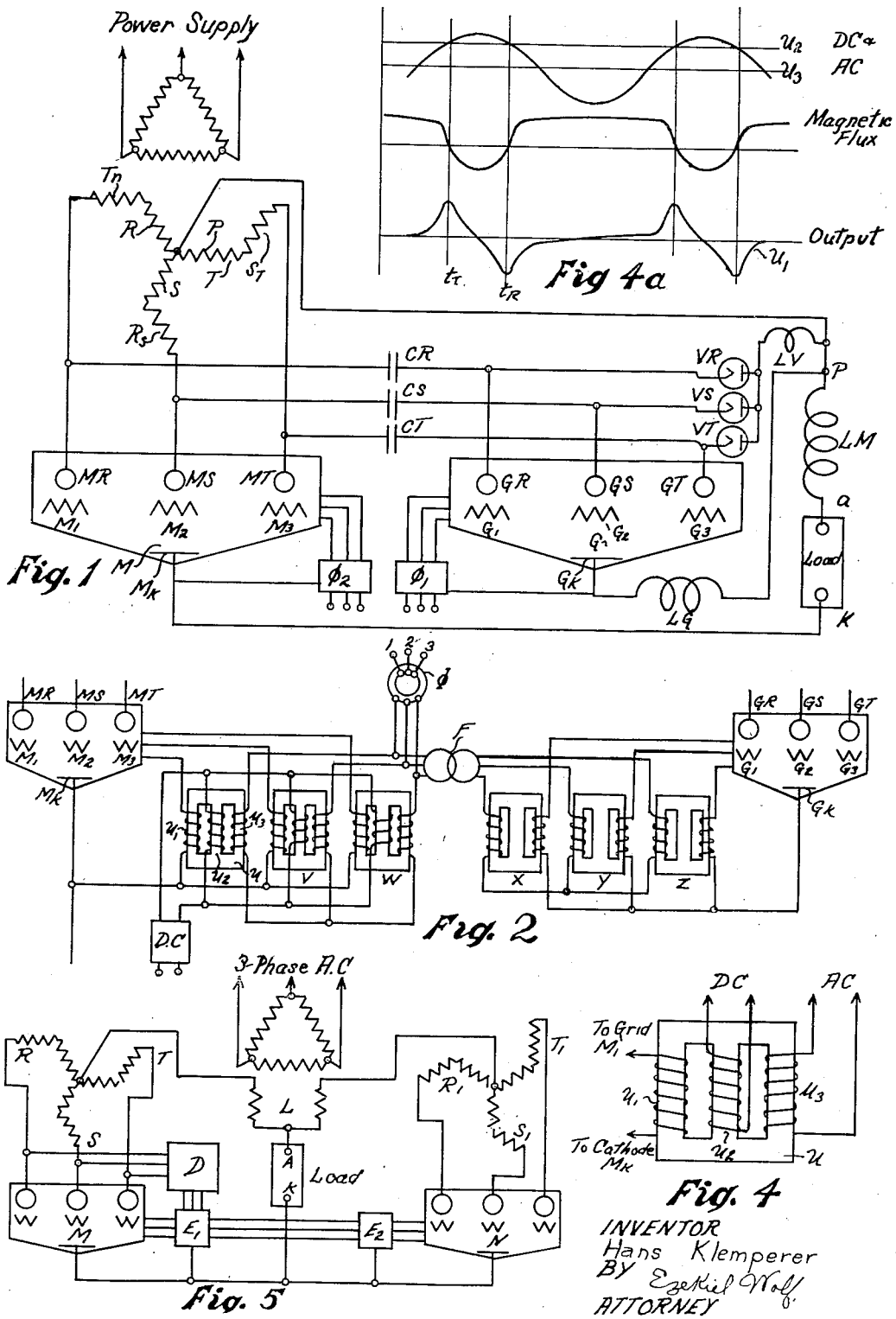

July 2, 1940.  H. KLEMPERER  2,206,701
RECTIFIER CIRCUITS
Filed Aug. 1, 1938  2 Sheets-Sheet 2
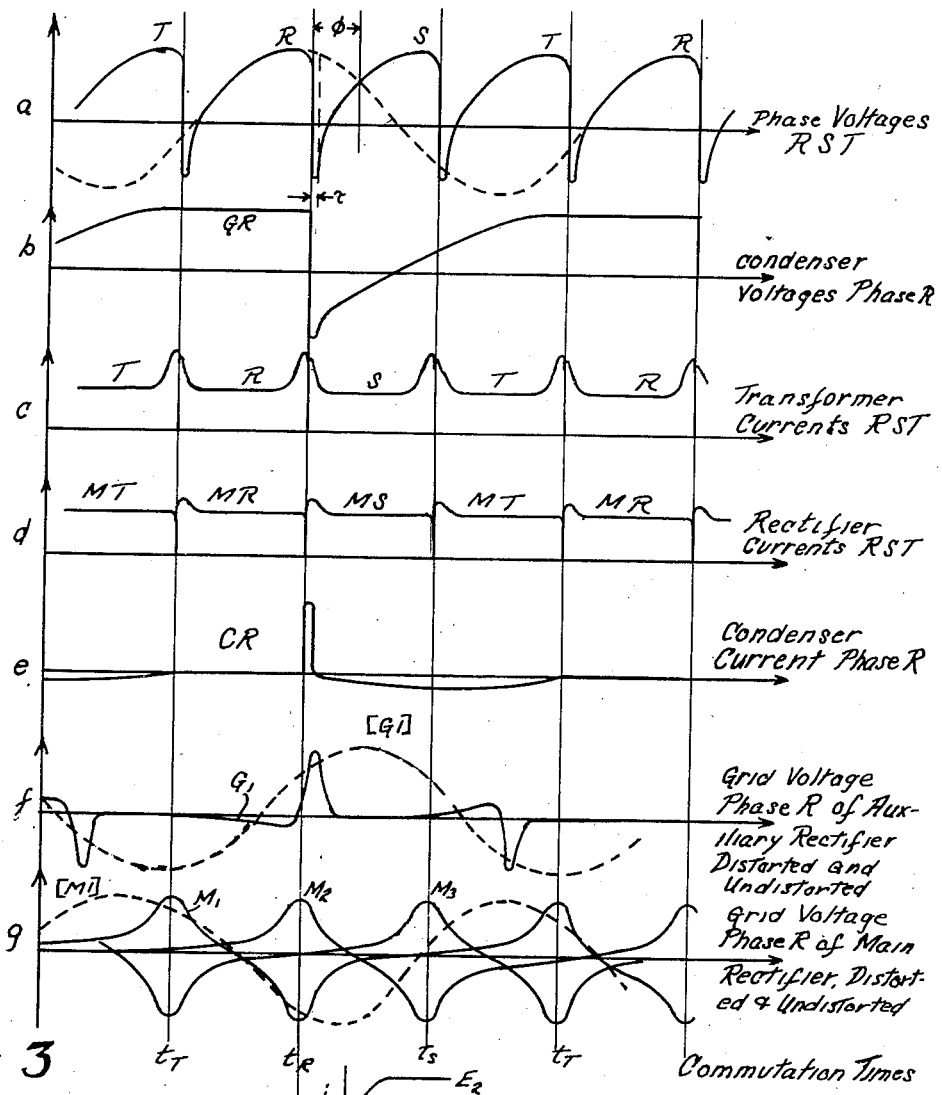
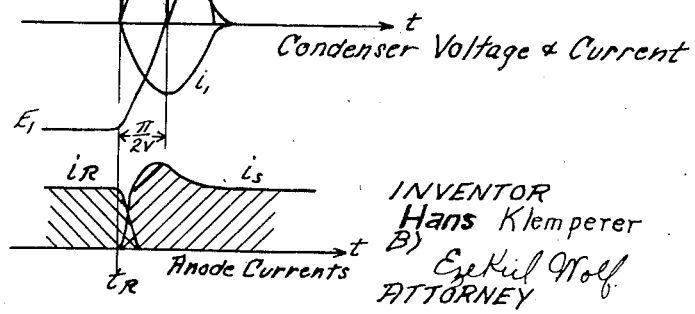

Patented July 2, 1940

2,206,701

UNITED STATES PATENT OFFICE 2,206,701

RECTIFIER CIRCUITS

Hans Klemperer, Newtonville, Mass., assignor to General Electric Company, a corporation of New York Application August 1, 1938, Serial No. 222,492

13 Claims. (Cl. 175—363)

The present invention relates to apparatus for the production of rectified current from alternating current, particularly for power purposes and in particular to control means for such rectification in order that a leading or unity power factor can be produced on the alternating current circuit instead of a lagging power factor as is usually the case at the present time.

In electric valve means for the rectification of alternating current, if power is controlled by means of ordinary grid, the start of flow of current in the electric valve means is delayed with respect to the voltage with the result that a lagging power factor is produced. In power circuits and networks such a lagging power factor makes it necessary to use phase advancing means or larger cross section conductors, larger machines, etc., and consequently the apparatus in general is more expensive than that used for the same power output where unity power factor is present. Various methods of correcting the power factor in rectifier circuits have been used, but they have not for one reason or another proved to be practical for large power rectification.

It has been suggested to eliminate the inductive or lagging power factor condition from grid controlled rectifier circuits, by using methods to advance the angle of commutation of the current instead of delaying it. Such methods would result in a leading power factor. Several methods to this effect have been suggested previously. Specially designed grids have been introduced to interrupt the arc in the rectifier, but such methods of control have so far never worked out satisfactorily. Condensers have been used as short circuit paths across the anodes of the rectifier, across anode and cathode of the rectifier or a single condenser across the rectifier and its transformer. Some of these circuits work on the principle to deflect the power current into condensers for the time needed to get deionization of the main discharge path. A calculation of the condenser size needed to produce this effect, shows, that about the same phase angle compensation could be reached if this capacity were connected to the alternating current network directly. In other circuits of this kind, the discharge current of the condenser flows through the main rectifier and thereby increases the probability or the frequency of backfires.

In accordance with my invention I provide a new circuit arrangement where the rectified power is not deflected into the condenser but into the next following phase by immediate pickup of the next anode while the condenser has to take care only of a fraction of the transient energy set free by the disappearance of the leakage flux of the interrupted transformer phase winding. In fact part of this energy is also deflected into the next following phase. In circuits where the flow of energy from the alternating current circuit to the direct current circuit is completely interrupted for the time necessary for deionization, large condensers or reactors on the direct current side are required to secure the uninterrupted flow of direct current, which are not necessary in the present system where actually no interruption of power flow takes place. Therefore only small capacitances are needed. The discharge current of the capacitances also is not transmitted through the main rectifier, as the following description will show.

In the present invention commutation is begun, not only by interrupting the discharge existing between cathode and anode of the main rectifier by means of diverting momentarily the current to an auxiliary rectifier which is connected in a condenser circuit, but also by simultaneously starting the discharge to the next following anode of the main rectifier which is forced to pick up or become conductive immediately and to carry the power current.

Each of the main anodes has in its circuit an anode choke coil, or the various windings in the rectifier transformer are interconnected on the different transformer legs, in such a way that rising current in one phase causes a rise in the current or voltage of the next following phase. At the moment when commutation of current from one anode to the next or succeeding anode in the order of phase rotation is desired, a condenser carrying opposite charge is connected in parallel to said transformer and choke coil windings. At this moment the current in these windings rises due to the opposite condenser charge. This causes the first anode to lose its voltage and renders it nonconducting, and causes the following anode to pick up or conduct immediately with an increased current. During the time that the first main anode is quenched, a negative grid voltage is supplied to the control grid associated with that main anode to prevent a rearcing while to the grid of the next anode which is intended to take over immediately the current a positive voltage is supplied in order to speed up this act of commutation.

In order to understand my invention more fully, reference is directed to the description and discussion in the specification below which should be considered in connection with the drawings showing an embodiment of my invention and graphs illustrating the operation of current and voltages in the system.

In the drawings,

Figure 1 shows diagrammatically the circuit arrangement for a rectifier for a three phase system.

Figure 2 illustrates a detail of Figure 1 for obtaining and controlling the phase and voltage form for the grid controls of the main and auxiliary rectifiers of Figure 1.

Figures 3 and 3a show the relative curves of currents and voltages associated with the circuits.

Figure 4 illustrates in detail the means of obtaining a proper wave shape for the grid control voltage of the main rectifier, and, Figure 4a shows the curves related thereto.

Figure 5 shows the arrangement for combining rectifiers of leading and lagging power factor.

In the diagram illustrated in Figure 1, there is shown a three phase power supply transformer whose secondaries serve as the output to the rectifier system. These secondaries are labelled R, S and T, each of which may have a portion of its windings in the next succeeding phase, as for instance, the phase S may have a winding $R_S$; the phase T will have a winding $S_T$ and the phase R will have a winding $T_R$. This type of interphase connection is commonly known as the zig-zag manner of connection. These interconnections between phases serve as will be explained later to transfer the magnetic energy from one phase to the following phase during the time of commutation.

Each leg or phase R, S and T, as indicated in Figure 1 is connected to its corresponding anodes MR, MS and MT respectively of the main rectifier M, whose cathode $M_K$ is of course one side of the load as indicated by the letter $k$. The other load lead is derived from the transformer neutral point P and is in series with the choke or inductance LM. In addition to the above there are provided three auxiliary circuits, each connected from the anode side of the rectifier MR, MS and MT, through a common inductive choke LG to transformer neutral P. These three series circuits connected in shunt across the phases comprise respectively capacities CR, CS and CT, each of which is connected to the anodes respectively, GR, GS and GT of an auxiliary rectifier G, which may be provided with a common cathode $G_K$. The cathode $G_K$ is connected to the transformer neutral P through the inductive reactance $L_G$ mentioned above.

In addition to the two rectifiers already mentioned, additional rectifier means is provided which is connected in opposite polarity to that of the auxiliary rectifier and in parallel relationship to it. This rectifier means is of a type designed to pass only a small amount of current and is preferably of the thermionic type or contact rectifier type that will serve to supply the small current required. To this purpose three rectifiers are provided, VR, VS and VT, connected in shunt in the same manner as the auxiliary rectifiers but through the inductance LV. These rectifiers which may conveniently be known as the condenser charging rectifiers, as has been stated, are connected in opposite polarity to the rectifier, so that the charging current to the condensers always flows in opposite direction to that of the auxiliary rectifiers. The two inductive chokes LG and LV are preferably on the same magnetic core, so that with the current flowing in opposite directions, the direct current saturation is avoided. The inductance LM may also if desired be wound on the same core with the inductances LG and LV and the magnetic flux balanced to avoid direct current saturation. The load may be connected across the terminals a—k. The grids of the main rectifier M1, M2 and M3 respectively associated with the three phases R, S and T, have their voltages controlled through the phase control 2, while the grids G1, G2 and G3 of the auxiliary rectifier corresponding to the phases R, S and T in this rectifier are controlled by the phase device 1.

The operation of the system is best explained in connection with the curves illustrated in Figures 3 and 3a. All of these curves are aligned for the same corresponding times, which are indicated by the vertical lines showing the commutation times $t_R$, $t_S$, $t_T$, for the phases R, S and T. The top curve of Figure 3 shows the combined phase voltages of R, S and T as appearing between transformer neutral P and rectifier cathode MK, with the dotted line indicating the full cycle of the alternating voltage of the phase R of the rectifier transformer. The commutation time of the phase R is indicated along the vertical line $t_R$. At the moment of commutation of current from the phase R to the phase S, the grid M1 of the main rectifier has gone negative, while grid M2 associated with main anode S is held positive. Now grid G1 of the auxiliary rectifier G reaches a positive peak as shown respectively by curves $g$ and $f$. This releases the discharge of the condenser CR and brings about the commutation in the system. The method of obtaining these peaked grid voltages and their relative relation and duration with respect to each other will be discussed hereinafter. At the present it is desired to point out the function of the various elements in the circuit during the moment of commutation.

When the grid G1 of the auxiliary rectifier becomes positive, this rectifier initiates the conduction of current in the phase R, discharging the condenser CR which has previously been charged through the thermionic rectifier VR as illustrated by the oscillogram $b$ of Figure 3.

It will be noted that during the positive half cycle of phase R, condenser CR remains substantially charged in a positive direction (see curve $b$). When the auxiliary rectifier circuit breaks down in the R phase, this condenser discharges and begins to charge in the opposite direction, causing for a very short time a large current to flow into the condenser CR as illustrated by the oscillogram $e$, thereby partially storing up the energy of disruption of the magnetic field in the R phase due to the commutation of the current at this instant. Before the auxiliary rectifier in the R phase begins to pass current, the grid $M_1$ in the main rectifier of the R phase has already become negative and now remains negative after the anode of the R phase has become deionized. This is necessary in order to prevent restriking of the discharge to MR which for some time after the condenser discharge is still somewhat more positive than anode MS which is carrying the current. After the intersection point of the phase voltages is reached, negative grid voltage is no more needed. In curve $a$ the time between commutation and so called "natural" phase voltage intersection is marked $\phi$. This corresponds to the control angle in ordinary rectifier circuits.

The discharge of the condenser CR through the transformer winding tends to make for a short time the anode MR more negative than the anode MS which is of course the next following anode and this short time has to be of sufficient duration to allow the complete deionization of the discharge path from the anode MR to the cathode, which time is of the order of $10^{-4}$ seconds. The transformer winding R carries an increased current during this interruption period which is indicated by the curve $c$ and simultaneously the phase S starts to conduct with an increased current due to the magnetic interconnection which has previously been described. The main rectifier anodes successively have increased current at the time of pick-up of every anode, but the condenser discharge current at the end of the conductive period is kept away from its anode. (See curve $d$.) The auxiliary rectifier G must carry a rather large discharge current for a very short time and is therefore usually a rectifier of the mercury pool type which is able to carry a large current flow for a short time.

The grid voltage of the auxiliary rectifier at the instant of commutation is of peaked wave form in the usual manner to provide a precise start of commutation. It should also be noted in relation to these curves that the condenser charging means brought about through the rectifiers VR, VS and VT, is slow and continuous and causes only a small current flow which occurs before the phase has become positive. This is shown by curve $e$. The curves in Figure 3a are also related to the commutation time $t_R$. The condenser voltage and current and anode current during the commutation are here more accurately set forth.

Curve $E_1$ represents the voltage of the condenser before commutation starts; $t_R$ is the time at which commutation is started. During commutation the current $i_2$ would flow into the condenser and charge it up to voltage $E_2$, if there was no magnetic interconnection. (Anode choke or phase interconnection in transformer.) Due to this magnetic interconnection, however, the condenser voltage rises only to $E_3$, while a part of $i_1$ of the current is transferred into the next following phase S, thus reducing the condenser current to $i_3$.

$$\frac{\pi}{2\gamma}$$

is a quarter of the natural period of the condenser circuit or approximately the time during which the quenched anode stays negative. It has to be larger than the deionization time $\tau$. The anode currents $i_R$ and $i_S$ which flow through the rectifier are given in the lower curve. There is no time interval between the end of $i_R$ and the start of $i_S$, but a slight overlapping, $i_S$ at the beginning is increased by $i_1$ due to magnetic interconnection. The condenser discharge current $i_3$ flows through the transformer, but does not flow through the rectifier; $i_R$ stops without a transient increase.

The grid voltage control for the auxiliary rectifier G is obtained in any one of the usual manners, through a peaking transformer as indicated at the right of Figure 2 by X, Y and Z. It is quite possible, especially in the single phase circuit to operate the grids in the described manner by using undistorted sine wave control voltages. However when more phases are used in the circuit, it becomes necessary to use properly distorted grid control voltages in order to secure a constant control angle, to speed up commutation and to avoid discharge of the condensers at the improper time. The grid voltage control of the main rectifier is obtained through means indicated at the left of Figure 2 by the transformers U, V and W, which is described in detail in Figure 4 in connection with the curves indicated in Figure 4a.

Referring more particularly to Figure 4, it will be seen that the transformer U has three interconnected cores, with two outer legs $U_1$ and $U_3$ and a center core $U_2$. The outer leg $U_3$ is supplied with alternating current of adjustable phase, while the center core $U_2$ is supplied with direct current in order to obtain a resultant magnetic flux indicated in the middle curve of Figure 4a. In the output $U_1$ of the transformer which feeds the grid of the main rectifier, the resultant distorted voltage is produced, as indicated by the lower curve in Figure 4a. It should be noted that the intersection points on the alternating and direct current curves in the upper portion of Figure 4a, corresponds to the peaks in the lower curve and to the commutation times $t_T$ and $t_R$ so that these intersections are chosen to distort the grid voltage so that their peaks will come at the times of commutation. On a three phase system therefore, the space between $t_R$ and $t_T$ correspond to 120°, and in a six phase system they would correspond to 60°, while in a twelve phase system, to 30°, and so on. Each of the transformers U, V and W indicated in the left of Figure 2 operate in this fashion and produce a distorted peaked voltage for controlling the grids of the main rectifiers.

Figure 2 shows the use of a further phase control element in the combination of the main and auxiliary rectifier. The auxiliary rectifier grid control voltages may each be shifted by means of the phase shift F with respect to the grid voltage supplies for the main rectifier. This may be any of the usual means including Selsyn devices, if desired.

The phase shifting device F may be permanently fixed or adjusted as desired. In addition to the shifting of grid voltage phases between main and auxiliary rectifier, the phase of both main and auxiliary rectifier are shifted with regard to the anode voltage. This is accomplished by phase shifting device $\phi$ of any of the well known types connected in circuit with the alternating current supply for all the grid transformers so that the combination may be advanced or retarded with respect to the alternating current phases and the discharge of the auxiliary electrodes may also be controlled with reference to the phases and the grid control of the main rectifier. In this way, power output of the rectifier as well as the amount of leading power factor may readily be controlled as well as the other phenomena relating to the commutation of the phases as described above.

In Figure 5 there is shown the combination of two rectifiers for producing both leading and lagging power factors. In this arrangement the rectifier at the left, M, may produce a leading power factor, while the rectifier N at the right may be used to establish the ordinary lagging power factor. The load is assumed to be applied between terminals $Ak$. The rectifier M in the present case is the same as that described in connection with the figures above, D in this figure representing the condensers, tubes and auxiliary rectifiers. $E_1$ represents the phase voltage controls for the grids of the main rectifier M and auxiliary rectifier G. The rectifier system on the right may be of the usual type with a grid voltage control E₂.

The two halves of the system may be coupled with an interacting choke L as indicated in the figure. The arrangement shown in Figure 5 may be used with apparatus of the type shown in Figure 2, wherein the phase of the leading and lagging power factors may be adjustably controlled to produce the desired alternating current load on the system.

The system shown in Figure 5 is applied to a three phase circuit, but it will be understood that similar arrangements may be used for a greater number of phases. The leading power factor on the left hand side of the system may of course be set in such a way as to compensate the lagging power factor on the right hand side of the system, or if a leading power factor is desired, the system on the left hand side may be made more leading than the system at the right is lagging. In case where two rectifier groups, one with leading and one with lagging power factor control are combined into one rectifying unit as shown by Figure 5, it is often of advantage to have phases R, S, T of group M for a certain amount of electrical degrees advanced or retarded with respect to the phases R, S, T of the other group N, as shown by Figure 5. Such a change in relative phase location reduces the necessary size of the interphase reactor L and greatly decreases the amount of harmonics in the circuit. It will of course be noted that the choke L may be connected in the same way as the chokes described in connection with Figure 1 to prevent direct current flux saturation in the core of the choke.

The above system has been described more particularly in connection with the use of rectifier tubes of the mercury pool type with cathode, anode and control grids. It will be readily understood however, that the system of the present invention may also be applied to other types of tubes, as for instance, ignitron tubes, where the grid control is replaced by cathode control.

The present invention may also apply to a so called inverter in which the prime source is direct current, and where it is desired to produce alternating current of desired frequencies. In such inverter circuits, due to the opposite direction of power flow, the power factor is capacitive if ordinary grid control means are used. If the described means are applied, the power factor becomes inductive.

Further it will be readily understood that the invention may also be usefully applied to polyphase rectifier tubes in which one or more series of anodes, grids and cathodes may be used.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

I claim:

1. In a converter system for converting alternating current into direct current or vice versa, a gaseous rectifier means having anodes, a cathode and control electrodes, means for periodically suppressing or reversing the voltage of the anodes temporarily in phase succession before the ordinary or natural intersection of phase voltages, a plurality of energy storage devices, and means operating also in phase succession substantially simultaneously with the preceding succession for connecting in a predetermined order said energy storage devices in circuit with the anodes to conduct the currents that have been suppressed or reversed in the preceding phases.

2. A rectifier system for converting alternating current into direct current comprising a plurality of phase conductors and an electric valve means having a plurality of anodes and a cathode, said anodes each connected to a different one of said phase conductors, means comprising a plurality of capacitances each connected to a different one of said phase conductors, means for electromagnetically linking said phase conductors, a circuit for discharging said capacitances in a predetermined order to effect commutation of the current among said anodes, and means for periodically closing and opening said last mentioned circuit.

3. A rectifier system for conversion of polyphase alternating current into direct current, comprising gaseous rectifier tube means having anodes connected in each phase and cathode means connected to a common connection of all phases, means shunting each phase including capacity elements and auxiliary rectifier means, a second rectifier means having individual elements connected through respective phases to said capacity elements in reverse direction to said auxiliary rectifier means, means for impressing a peaked voltage corresponding to each phase voltage on said auxiliary rectifier for discharging and charging said capacity elements in opposite relation to that effected by said second rectifier means, and means for maintaining deionization of said anode directly following the impression of said peaked voltage.

4. In a polyphase alternating current system having a plurality of phases with gaseous rectifier elements in each phase, means connected to said phases for storing magnetic energy of said phases at the time of commutation thereof, said means including a series circuit having a condenser, inductive elements and circuit closing means, said series circuit having a natural oscillation time period at least four times greater than the time needed for the deionization of the rectifier.

5. In a rectifier system for polyphase alternating current having a plurality of phases, a polyphase gaseous rectifier having anode elements for each phase, cathode means and control means, means including a condenser and second rectifier having grid control means connected in series with each other and across each phase, means for supplying peaked alternating voltage phases to said control grids in opposite directions to commence a discharge across said second rectifier and prevent restriking across said first rectifier of the phase being commutated.

6. In a rectifier system for polyphase alternating current having a plurality of phases, a polyphase gaseous rectifier having anode elements for each phase, cathode means and control means for each of said phases, means including a condenser and a second rectifier having grid control means connected in series with each other and across each phase, means for supplying peaked alternating current voltages to said second rectifier control grids to release a discharge successively across said rectifiers, and means for applying peaked alternating voltages across said first rectifier to prevent restriking of the arc across one phase and commencing of discharge on the next following phase, which peaked voltage controls are of such a shape that the negative peaks follow the positive peaks in the phase relation of $$\frac{360}{N}$$

where N is the number of phases.

7. In a system for rectifying alternating current and for controlling the power factor of an associated alternating current circuit, the combination of two rectifiers each having at least one control member, commutating means associated with one of said rectifiers for controlling said one rectifier to transmit current at a leading power factor, and means associated with the other of said rectifiers for controlling said other rectifier to transmit current at a lagging power factor.

8. In a polyphase rectifier system for rectifying polyphase alternating current, a plurality of gaseous rectifier means in each phase, and comprising an anode, cathode and grid control means provided for each phase, a second rectifier having capacitive connections with said phase, said second rectifier having grid control means, means for impressing on said grid control means of said first mentioned and said second rectifier voltages of predetermined phase displacement relative to the associated anode voltages, means controlling the relative phase displacement of said voltages of said first and second rectifiers, and means for displacing said control member voltages by a fixed phase difference.

9. In a system for converting alternating current into direct current or vice versa, two rectifier groups, one of said groups controlled to produce a leading power factor and the other a lagging power factor, means for arranging the transformer windings of one group at a different phase angle from the transformer windings of the other group whereby the harmonics in the circuit are reduced to a minimum.

10. In combination, a polyphase alternating current circuit, a direct current circuit, electric translating apparatus connected between said circuits and comprising an inductive network and a plurality of phase conductors and an electric valve means of the type employing an ionizable medium and having a plurality of anodes each associated with a different one of said phase conductors, and means connected to said anodes for storing the magnetic energy of said inductive network at the time of commutation of current among said anodes and comprising a serially connected capacitance and an inductance, said last mentioned means having a natural oscillation period substantially greater than the time required for the deionization of said electric valve means.

11. In combination, an alternating current circuit, a direct current circuit, apparatus connected between said circuits for transmitting electric power therebetween comprising two electric translating circuits each including an inductive network and an associated electric valve means of the controlled type each having a control member for controlling the conductivity thereof, commutating means associated with one of said electric valve means for causing the associated electric translating circuit to operate at a leading power factor, and means for impressing on the control members of said electric valve means periodic voltages variable in phase with respect to the voltage of the alternating current circuit to control the power factor of said alternating current circuit.

12. In combination, an alternating current circuit, a direct current circuit, apparatus connected between said circuits for transmitting electric power therebetween and comprising a pair of electric translating circuits each including an inductive network and an electric valve means of the controlled type having control members for controlling the conductivities thereof, commutating means connected to one of said electric valve means for permitting operation thereof at a leading power factor, means for impressing on the control members of that electric valve means periodic voltages of predetermined phase displacement relative to the voltage of said alternating current circuit, and means for impressing on the control members of the other electric valve means periodic voltages of a different predetermined phase displacement with respect to the voltage of said alternating current circuit.

13. In combination, an alternating current circuit, a direct current circuit, and means for controlling the power factor of said alternating current circuit including apparatus connected between said circuits and comprising a pair of electric translating circuits each having an inductive network and an electric valve means of the controlled type having control members for controlling the conductivity thereof, means for impressing on the control members of one of said electric valve means periodic voltages of a predetermined phase displacement to cause the associated electric translating circuit to operate at a lagging powed factor, means for impressing on the control members of the other electric valve means periodic voltages to cause the associated electric translating circuit to operate at leading power factor, commutating means associated with said other electric valve means, and means for simultaneously controlling the voltages impressed on said control members of both of the electric valve means.

HANS KLEMPERER.